(12) United States Patent
Nakasuna

(10) Patent No.: US 6,711,003 B2
(45) Date of Patent: Mar. 23, 2004

(54) MONITOR DEVICE

(75) Inventor: Seiko Nakasuna, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 311 days.

(21) Appl. No.: 09/879,295

(22) Filed: Jun. 12, 2001

(65) Prior Publication Data

US 2002/0021279 A1 Feb. 21, 2002

(30) Foreign Application Priority Data

Jul. 7, 2000 (JP) ........................................ 2000-206685

(51) Int. Cl.⁷ ................................................ G06F 1/16
(52) U.S. Cl. ........................ 361/681; 361/683; 345/87; 248/476
(58) Field of Search .................. 361/681, 726, 361/732, 756; 248/476, 479, 480, 485, 487, 919–921, 276, 287, 179.1; 296/24.1, 37.7, 37.8; 340/425.5, 428, 315.4, 990, 405, 459, 525, 466, 462, 815.58; 348/837, 839, 840–843, 836; 312/7.2, 236, 298; 292/95, 121–126, 224; 224/311, 309, 312; 284/919–924; 180/167

(56) References Cited

U.S. PATENT DOCUMENTS

| | | | | |
|---|---|---|---|---|
| 5,096,271 A | * | 3/1992 | Portman | 312/7.2 |
| 5,173,686 A | * | 12/1992 | Fujihara | 345/87 |
| 5,946,055 A | | 8/1999 | Rosen | |
| 6,181,387 B1 | * | 1/2001 | Rosen | 348/837 |
| 6,199,810 B1 | * | 3/2001 | Wu et al. | 248/291.1 |
| 6,256,078 B1 | * | 7/2001 | Ogata | 349/58 |
| 6,292,236 B1 | * | 9/2001 | Rosen | 348/837 |
| 6,364,390 B1 | * | 4/2002 | Finneman | 296/37.7 |
| 6,529,123 B1 | * | 3/2003 | Paul, Jr. | 340/425.5 |
| 6,557,812 B2 | * | 5/2003 | Kutzehr et al. | 248/476 |

FOREIGN PATENT DOCUMENTS

| | | | | |
|---|---|---|---|---|
| JP | 407236103 A | * | 9/1995 | H04N/5/64 |
| JP | 407236104 A | * | 9/1995 | H04N/5/64 |
| JP | 408022254 A | * | 1/1996 | G09F/9/00 |
| JP | 411127403 A | * | 5/1999 | H04N/5/64 |
| JP | 411310087 A | * | 11/1999 | B60R/11/02 |
| JP | 411342798 A | * | 12/1999 | B60R/11/02 |
| JP | 02000159197 A | * | 6/2000 | B64D/11/00 |

* cited by examiner

Primary Examiner—Michael Datskovskiy
(74) Attorney, Agent, or Firm—Brinks Hofer Gilson & Lione

(57) ABSTRACT

In a monitor device wherein a display member is pivotably supported in a ceiling portion of a vehicle, there is a risk that the display member may slide down due to vibrations during vehicular running or due to its own weight. In the monitor device of the invention, a stowing recess 11 is formed in a receptacle member 10, and a display member 2 and a support member 5 are disposed within the stowing recess 11. A retaining member 12 for restricting a distal end 2a of the display member 2 is formed at an opening edge of the stowing recess 11. When the display member 2 is stowed, it moves in the Y1 direction and its pivotal movement in a downward direction is prevented by the retaining member 12. When the display member 2 is to be moved in an opening direction, it is moved in the Y2 direction and is thereby disengaged from the retaining member 12; thereafter the display member 2 is rotated downward.

19 Claims, 5 Drawing Sheets

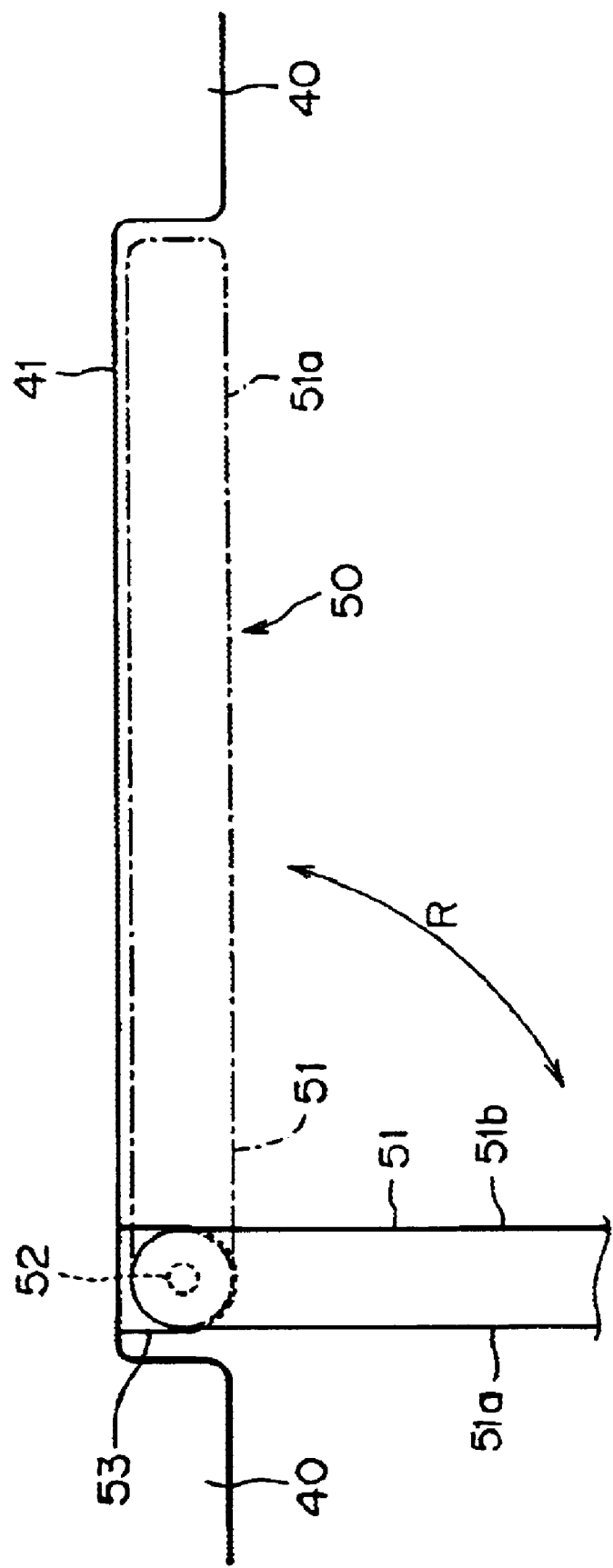

MONITOR DEVICE

BACKGROUND OF THE INVENTION

1. Field of the Invention

The present invention relates to a monitor device for use in a vehicle or the like and more particularly to a monitor device capable of being locked toward a ceiling surface when a display member is to be stowed.

2. Description of the Prior Art

FIG. 5 is a sectional view showing a conventional monitor device 50 for a vehicle.

A display member 51 of the monitor device 50 is provided on a front side 51b thereof with a display screen such as a liquid crystal display. The display member 51 is disposed within a recess 41 formed in a ceiling surface 40 in the interior of a vehicle. At one end of the display member 51 is provided a pivot shaft 52, the pivot shaft 52 being supported pivotably by a support piece 53 which is provided within the recess 41.

The monitor device 50 is pivotable in the direction of arrow R with the pivot shaft 52 as the fulcrum. When the monitor device 50 is in use, it assumes a downward position as indicated by a solid line, permitting occupants of the vehicle to see the display screen on the front side 51b from the interior of the vehicle, while when the monitor device 50 is not in use, it assumes a stowed position along the ceiling surface as indicated by a broken line.

In the conventional monitor device 50, the display member 51 is manually moved pivotally between the downward position and the stowed position.

However, the conventional monitor device 50 has the problem that when the display member 51 is in its stowed position as indicated with a broken line in FIG. 5, the display member 51 naturally moves downward pivotally due to vibrations during vehicular running and/or a mechanical play, and a back side 51a of the display member projects from the ceiling surface 40, thus degrading the monitor device.

In the monitor device 50, moreover, since the operation for pivoting the display member 51 is a manual operation, the operation is troublesome, and when the display member 51 is to be stowed, it is necessary to raise the display member 51 manually up to a sufficient height, or else it will be impossible to stow the display member 51 positively into the recess 41.

SUMMARY OF THE INVENTION

The present invention solves the above-mentioned problems and it is an object of the invention to provide a monitor device wherein a display member does not pivot downward even under vibration during vehicular running and which permits the display member to be positively brought into a stowed position along a ceiling surface by a simple operation.

According to the present invention, for solving the foregoing problems, there is provided a monitor device including a support member mounted on a ceiling surface and a display member, the display member being supported by the support member so as to be pivotally movable between a stowed position along the ceiling surface and a downwardly pivoted position, wherein the support member is movable along the ceiling surface, there is provided a restricting means for preventing the display member from moving pivotally to its downward position when the support member and the display member located in the stowed position move in one direction, and the display member moves away from the restricting means and can move pivotally toward the downward position when the support member and the display member are moved in a direction opposite to the one direction.

According to this construction, with the display member pivoted to the stowed position along the ceiling surface, the display member is slid into engagement with the restricting means, whereby the display member is prevented from pivoting downward. Therefore, even under vibration there is no risk of the display member being pivoted downward by its own weight.

Preferably, there are used a drive means for pivotally moving the display member under power and a moving means for moving the support member in the above directions under power. With such drive means and moving means, the display member can be moved automatically between the position restricted by the restricting member and the downward position by operating an operating button.

The support member and the display member also may be moved manually, allowing the display member to come into engagement with the restricting means, or the display member may be pivoted manually from the downward position to the stowed position.

In the case where the drive means is provided, it is preferable for the drive means to operate in such a manner that the display member is pushed toward the ceiling surface before the support member and the display member in the stowed position move in the aforesaid one direction.

By such an operation the display member can be securely engaged with the restricting means.

The monitor device according to the present invention may be constructed such that a receptacle member is fixed to the ceiling surface, a stowing recess which opens downward is formed in the receptacle member, the support member is movable within the stowing recess, the display member when pivotally moved to the stowed position is stowed within the stowing recess, and the restricting means is provided within the stowing recess.

In this construction, since the display member in the stowed position is stowed within the stowing recess formed in the receptacle member, the display member presents a good appearance in its stowed state, and by covering the receptacle member or the surroundings thereof with a cushionable member it is possible to enhance the safety of the occupants in the interior of the vehicle.

Further, there may be adopted a construction wherein a base member is fixed to the vehicular ceiling surface, the receptacle member is fixed to the underside of the base member, a circuit board for control is installed in the base member, and the support member provided within the receptacle member and the circuit board are connected together through a flexible wiring member.

If the base member and the receptacle member are thus fabricated as separate members and if the base member is used as a common component for example, it becomes easy to change the receptacle member according to the type and size of the display member used. Alternatively, if the receptacle member and the display member are used as common components and the base member is changed in conformity with the ceiling shape of the vehicle concerned, it becomes possible to install the monitor device in various vehicles.

Further, the display member may be configured so that in its pivoted state in the downward position the display member can pivot so as to permit the direction of the display screen to be changed to the right and left.

BRIEF DESCRIPTION OF SEVERAL VIEWS OF THE DRAWINGS

FIG. 5 is a sectional view of a conventional monitor device.

DETAILED DESCRIPTION OF PREFERRED EMBODIMENTS

Figure 1:
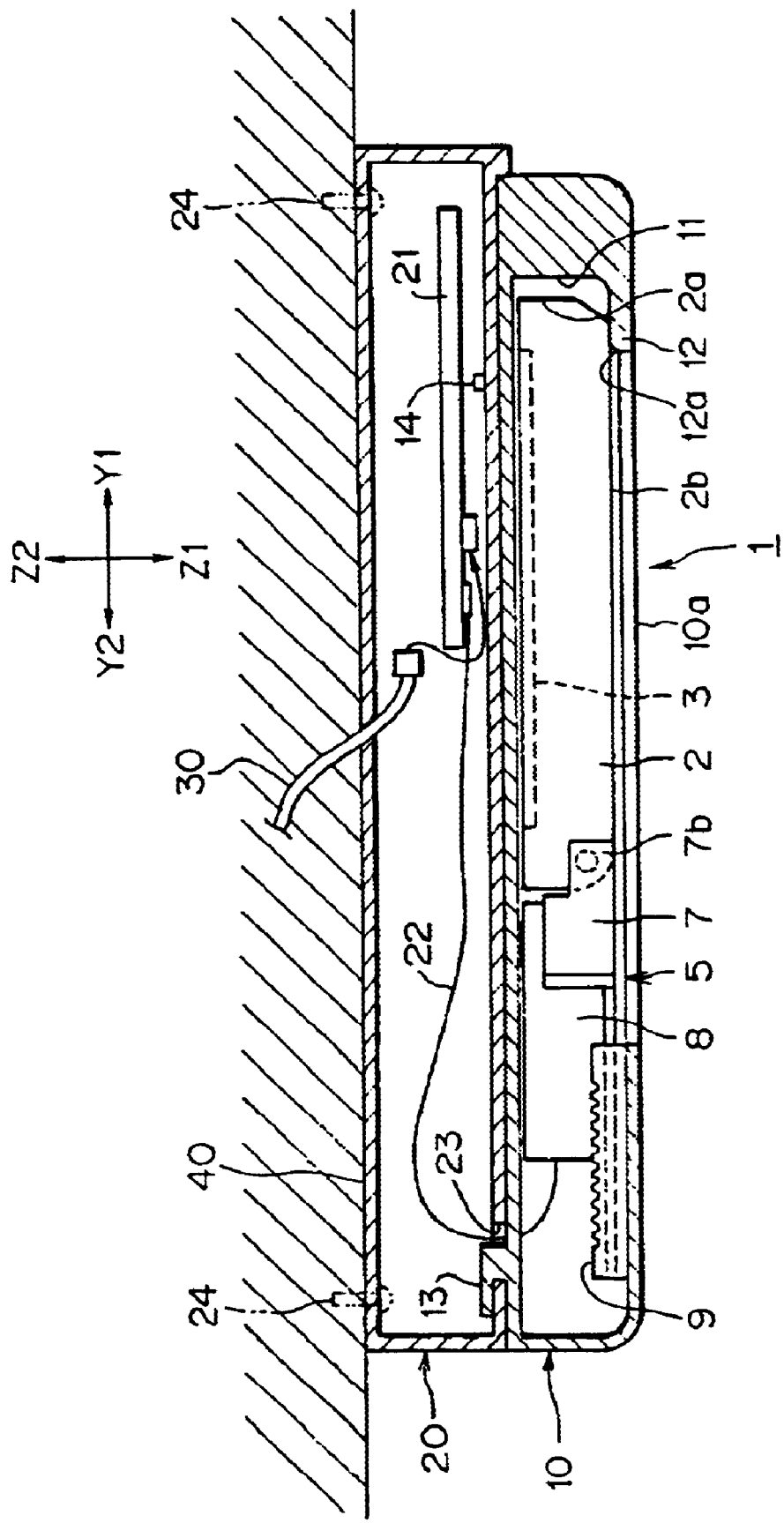
FIG. 1 is a sectional view of a monitor device according to an embodiment of the present invention, showing a state in which a display member is restricted by a restricting means.
Figure 2:
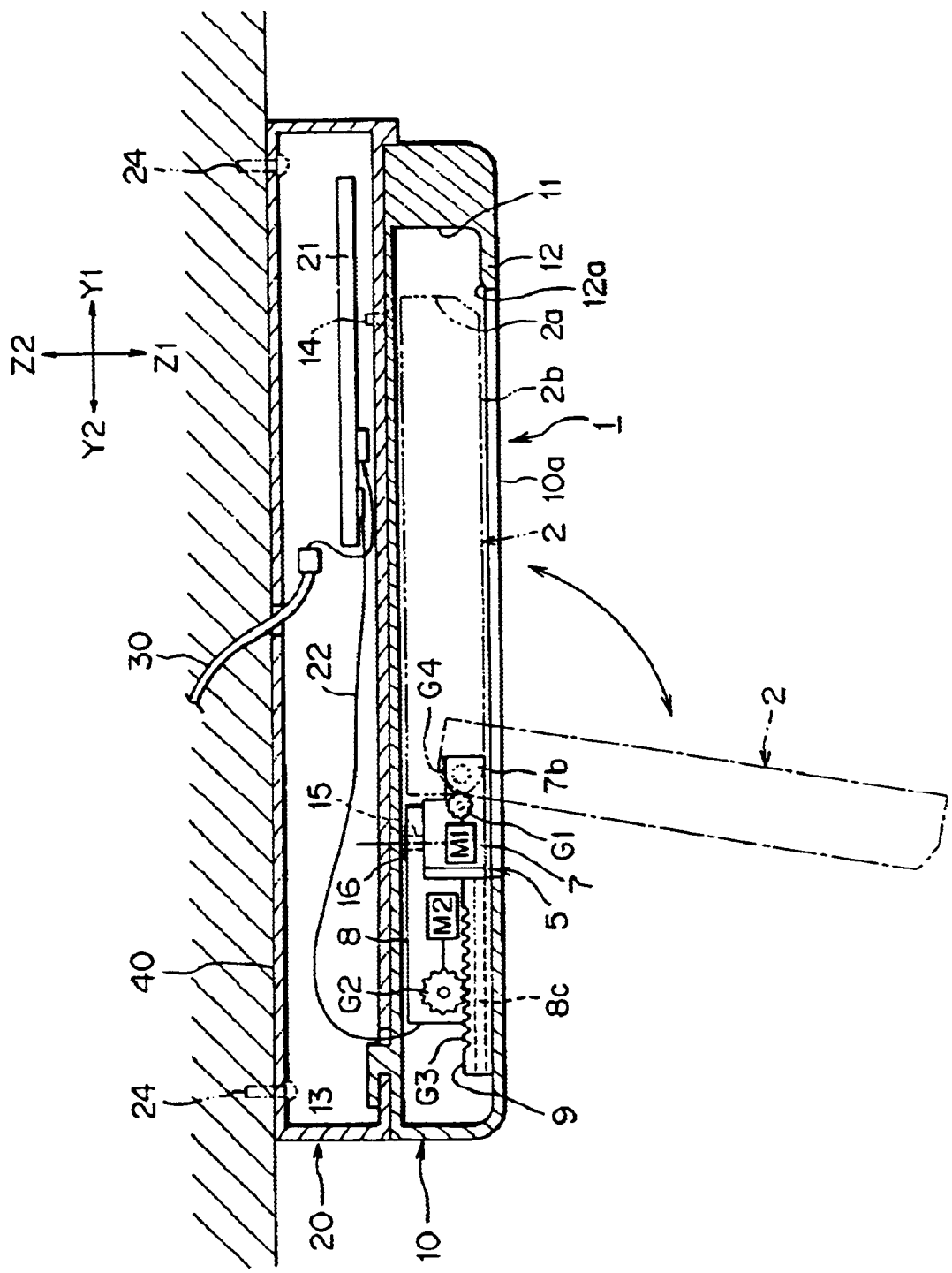
FIG. 2 is a sectional view showing an internal structure and operation of the monitor device.
Figure 3:
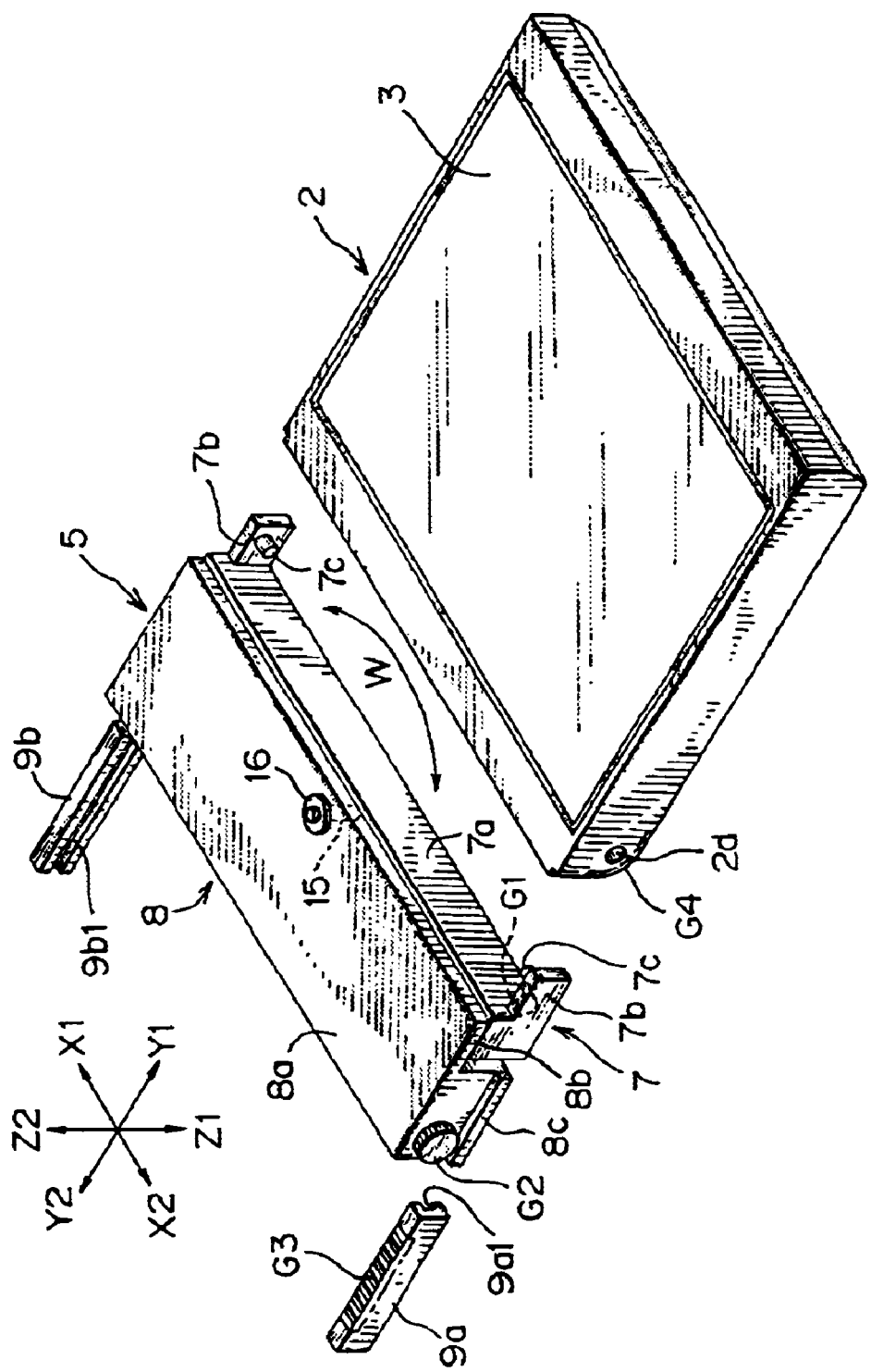
FIG. 3 is an exploded perspective view showing the display member and a support member.

An embodiment of the present invention will be described below with reference to FIGS. 1 to 3, of which FIG. 1 is a sectional view of a monitor device according to one embodiment of the present invention, showing a state in which a display member in a stowed position is restricted by a restricting member, FIG. 2 is a sectional view showing the operation of the monitor device and showing the manner in which the display member moves pivotally between the stowed position and a downward position, and FIG. 3 is an exploded perspective view showing the display member and a support member.

As shown in FIGS. 1 and 2, a monitor device 1 embodying the invention is attached to a ceiling surface 40 in the interior of a vehicle. The monitor device 1 may be mounted at any desired position on the ceiling. For example, in the interior of the vehicle it may be mounted to a ceiling portion located between the driver's seat and a front passenger's seat, a ceiling portion on the driver's seat side, or a ceiling portion located above the rear seat.

The monitor device 1 is provided with a receptacle member 10 and a base member 20. Inside the receptacle member 10 is formed a stowing recess 11 having an opening 10a as a partially cutout portion. Within the stowing recess 11, a display member 2 is disposed on one side in the Y direction and a support member 5 is disposed on the opposite side. At an edge portion of the opening 10a a retaining member 12 is formed integrally with the receptacle member 10, the retaining member 12 functioning as a restricting means.

A flat display panel 3 such as a liquid crystal display is installed in the display member 2 in such a manner that its display screen faces upward when the display member is stowed. As shown in FIG. 3, a pair of pivot holes 2d are formed in side faces of a base end portion of the display member 2 and a partial gear G4 of a predetermined pitch circle is integrally formed around one pivot hole 2d. Alternatively, a gear may be fixed around one pivot hole 2d.

The support member 5 is made up of a rotating base 7 and a moving base 8.

As shown in FIG. 3, the rotating base 7 is formed as a block-like housing 7a formed of a synthetic resin or a metal. At both ends of the housing 7a are integrally formed a pair of support pieces 7b so as to project toward the display member 2. A pair of inwardly projecting pivot shafts 7c are integral with the support pieces 7b respectively.

The pivot shafts 7c of the rotating base 7 are inserted into the pivot holes 2d of the display member 2, whereby the display member 2 is supported vertically pivotably with respect to the rotating base 7.

As shown in FIG. 2, the rotating base 7 is provided with a motor M1 and a transfer gear G1, together constituting a rotative drive means. Power of the motor M1 is transmitted to the transfer gear G1 via a group of reduction gears (not shown). The rotating base 7 has an opening (not shown) formed on its side opposed to the display member 2, with some or all of the teeth of the transfer gear G1 being exposed from the said opening. The transfer gear G1 is in mesh with the partial gear G4 of the display member 2. The transfer gear G1 and the partial gear G4 may be provided in a pair on both sides (X1 side and X2 side) in the transverse direction.

The moving base 8 is formed as a block-like housing 8a formed of a synthetic resin or a metal. An overhanging portion 8b is integrally formed at an upper end of the housing 8a so as to project toward the rotating base 7. The overhanging portion 8b is positioned on an upper surface of the rotating base 7.

As shown in FIGS. 2 and 3, on the upper surface of the rotating base 7 and centrally in the transverse direction there is integrally formed a pivot shaft 15. A bearing is provided in the overhanging portion 8b of the moving base 8 and the pivot shaft 15 is inserted pivotably into the bearing. Further, an anti-dislodgment ring 16 is fitted on a tip end of the pivot shaft 15. Thus, the rotating base 7 is supported pivotably with respect to the moving base 8 and so as not to become disengaged from the moving base 8.

On both side faces of the moving base 8 are formed outwardly projecting slide projections 8c so as to extend along the Y1–Y2 direction (though only one side is shown, the opposite side is similarly configured). The moving base 8 is provided with a motor M2 and a pinion gear G2 as a moving means. Power of the motor M2 is transmitted to the pinion gear G2 while being reduced by a group of reduction gears (not shown).

The motor M2 is mounted in the interior of the moving base 8, while the pinion gear G2 is exposed from one side face of the moving base 8 at a position above the slide projection 8c located on that side.

Inside both inner side faces of the receptacle member 10 are respectively fixed elongated guide members 9a and 9b which extend in the Y1–Y2 direction. In the inner side faces of the guide members 9a and 9b are respectively formed guide grooves 9a1 and 9b1 in the Y1–Y2 direction. An upper surface of the guide member 9a is formed with a rack gear G3 in the Y1–Y2 direction.

The slide projections 8c of the moving base 8 are fitted in the guide grooves 9a1 and 9b1, whereby the moving base 8 is guided in the Y1–Y2 direction (longitudinal direction). At this time, the rack gear G3 comes into mesh with the pinion gear G2 of the moving base 8. Alternatively, the pinion gear G2 and the rack gear G3 may be provided on both sides (X1 side and X2 side) respectively in the transverse direction.

As shown in FIGS. 1 and 2, the receptacle member 10 with the display member 2 and the support member 5 received therein is fixed to the base member 20. In the interior of the base member 20 is accommodated a circuit board 21 provided with a control circuit which controls the display member 2, rotating member 7 and moving base 8.

In the four corners of an upper surface of the base member 20 are formed mounting holes, and screws 24 are inserted into the mounting holes with their tip ends threadedly fixed to the ceiling surface 40, whereby the base member 20 is fixed to the ceiling surface 40.

The receptacle member 10 is fixed to a lower surface of the base member 20. A retaining hole 23 is formed in the lower surface of the base member 20, while an upper surface of the receptacle member 10 is formed with a hook 13 to be engaged within the retaining hole 23. With the hook 13 engaged within the retaining hole 23, the receptacle member 10 and the base member 20 are fixed to each other with screws 14. In other words, the receptacle member 10 can be separated from the base member 20 by removing the screws 14. For example, the base member 20 may be used as a common component, while there may be provided different shapes and sizes of receptacle members 10 according to various types and sizes of display members 2, whereby a desired receptacle member 10 can be selected and fixed to the base member 20.

The circuit board 21 installed within the base member 20 is provided with a connector for external connection, and a control line 30 is connected to said connector from the exterior. Further, a flexible substrate 22 such as a film formed with a circuit pattern, for example, is connected to the circuit board 21. The flexible substrate 22 is further connected to the motor M2 disposed within the moving base 8, the motor M1 disposed within the rotating base 7, and the display member 2.

The control line 30 referred to above is connected to a control unit (not shown) which controls rotation of the display member 2, power ON, volume control, and channel selection. The control unit is operated by an operating member. The operating member is mounted on a front or rear seat or an instrument panel in the interior of the vehicle, or it is a remote controller using infrared transmission.

The following description is now provided about the operation of the monitor device 1.

With the monitor device 1 not in use, as shown in FIG. 1, the display member 2 is in its stowed position parallel to the ceiling surface 40 and is received within the stowing recess 11 of the receptacle member 10. In this state, a distal end 2a of the display member 2 is positioned on the retaining member 12 and a downward rotation of the display member 2 is prevented by the retaining member 12.

When an operation signal for pivoting the display member 2 is provided to the control unit by the operating member, the control circuit effects control so that from the state of FIG. 1 the motor M2 in the moving base 8 turns ON and the pinion gear G2 turns counterclockwise. The pinion gear G2 moves in the Y2 direction on the rack gear G3 while meshing with the rack gear. At the same time, the display member 2 moves and its distal end leaves the retaining member 12. When the moving base 8 has moved in the Y2 direction up to a position where the display member 2 does not contact the retaining member 12 even if it turns, the motor M2 turns OFF.

In this case, preferably, control is effected so that the motor M1 is turned ON just before the moving base 8 and the display member 2 move in the Y2 direction, to impart to the display member 2 a rotating force in a rising direction. As a result, the moving base 8 and the display member 2 move in the Y2 direction after complete separation of the display member 2 and the retaining member 12 from each other. Thus, the display member 2 and the retaining member 12 can be prevented from being rubbed against each other and hence a back 2b of the display member 2 can be prevented from being marred. In addition, the moving base 8 and the display member 2 can be certain to move in Y2 direction because there occurs no friction between the display member 2 and the retaining member 12.

When the moving base 8 stops after its movement in Y2 direction, the motor M1 in the rotating base 7 turns ON and the transfer gear G1 is rotated counterclockwise. As a result, the transfer gear G1 imparts a clockwise rotating force to the partial gear G4 of the display member 2, so that the display member 2 rotates downward (in the Z1 direction) out of the stowing recess 11. Then, as indicated with a dot-dash line in FIG. 2, the display member 2 assumes its downward position and it becomes possible to see the display panel 3 from the interior of the vehicle, whereupon the motor M1 turns OFF.

By controlling the rotating time of the motor M1 it is possible to control the angle of the downward position of the display member 2. For example, if a downward position angle is stored beforehand in a memory provided in the control circuit, it becomes possible to set the angle of inclination of the display member 2 at the same angle whenever the display member rotates downward.

Further, by pivoting the display member 2 to the right and left about the pivot shaft 15, the display screen of the display member 2 can be directed in any direction to the right or left. In this case, it is optional whether the pivoting operation is to be performed manually or by using the power of a motor.

When a command for stowing the display member 2 is issued by the operating member, the motor M1 in the rotating base 7 rotates and the transfer gear G1 is rotated clockwise via a group of gears. With the transfer gear G1, the partial gear G4 is driven counterclockwise and the display member 2 is rotated upward (in Z2 direction). When the display member 2 has rotated up to the position where it is received completely within the stowing recess 11, the motor M1 turns OFF.

Further, the motor M2 rotates, the pinion gear G2 is thereby rotated counterclockwise and moves on the rack gear G3, and the moving base 8 and the display member 2 move in the Y1 direction. When a lower surface of the display member 2 has reached the position above the retaining member 12, the motor M2 turns OFF.

It is preferable that when the moving base 8 and the display member 2 are moved in the Y1 direction by the motor M2, the motor M1 be also rotated to impart an upward rotating force to the display member 2. By so doing, the distal end 2a of the display member 2 can move to a position above the retaining member 12 without abutment against the retaining member 12. Thus, the distal end 2a of the display member 2 is certain to move above the retaining member 12, and it is possible to prevent the distal end 2a from abutting the retaining member 12 into a locked state.

If an upper surface of an end portion of the retaining member 12 is tapered at 12a, the distal end 2a of the display member 2 moving in the Y1 direction can be directed surely up to the position above the retaining member 12.

Figure 4:
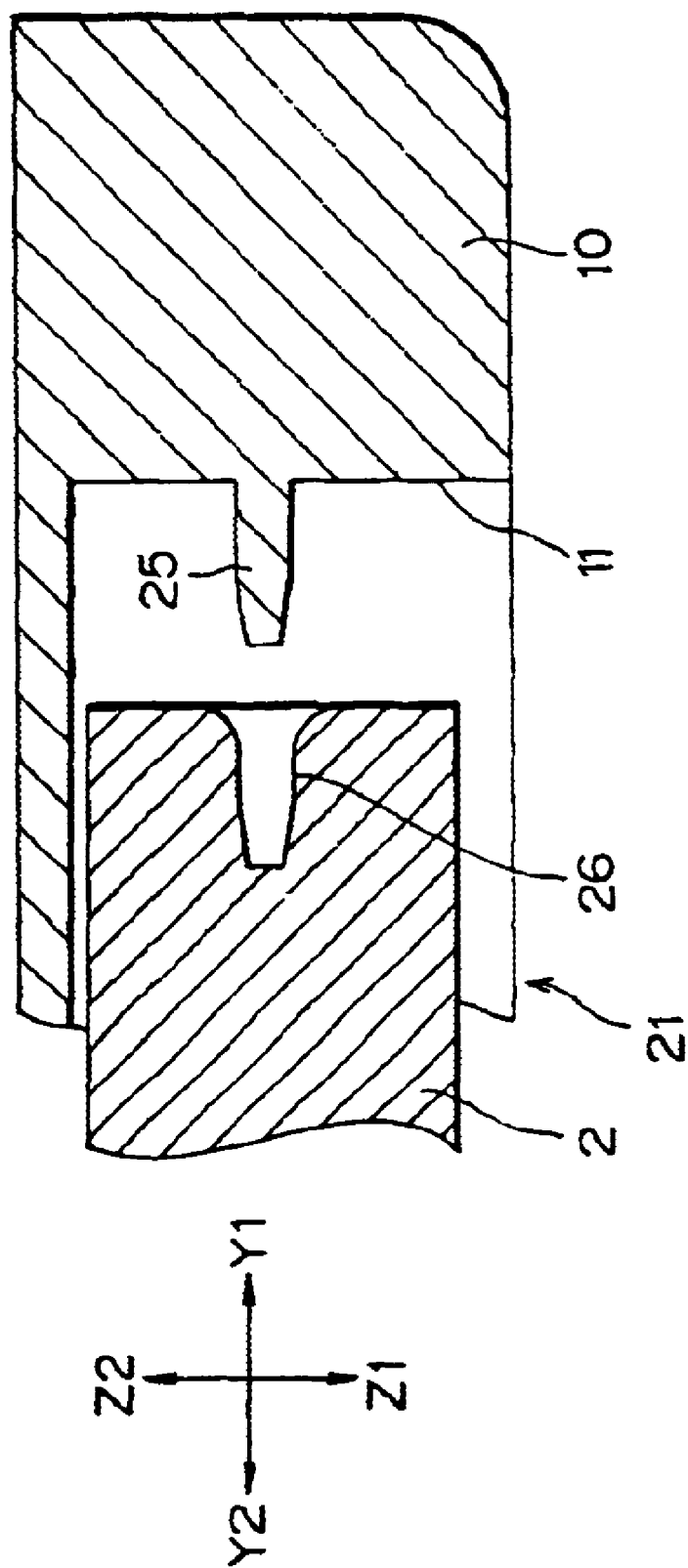
FIG. 4 is a partially enlarged sectional view of a monitor device according to another embodiment of the present invention.

FIG. 4 is a partially enlarged sectional view of a monitor device 21 according to another embodiment of the present invention, showing another restricting means. In this monitor device 21, the construction of the portions other than the restricting means is the same as in the monitor device 1 of the previous embodiment and therefore an explanation thereof will be omitted here.

In the monitor device 21 shown in FIG. 4, a fitting projection 25 which functions as a restricting means is formed within a stowing recess 11 of a receptacle member 10 on the side opposed to a display member 2. On the other hand, the display member 2 is formed with a fitting recess 26 in a position opposed to the fitting projection 25.

In the monitor device 21, when the display member 2 is stowed, the fitting projection 25 is inserted into the fitting recess 26 to prevent a downward rotation of the display member 2. For rotating the display member 2 in its opening direction, the display member 2 is moved in the Y2 direction to disengage the fitting recess 26 from the fitting projection 25 and is thereafter rotated downward.

Regarding the restricting means composed of the fitting projection 25 and the fitting recess 26, the fitting projection and the fitting recess may be formed on the display member 2 side and the stowing recess 11 side, respectively. As to each of the fitting projection 25 and the fitting recess 26, the number thereof is not limited to one, but may be a plural number.

The display member 2 may be rotated manually and the moving base 8 may also be moved manually in the Y1–Y2 direction.

According to the present invention, as set forth above, the display member is stowed toward the ceiling and there is no risk of the display member sliding down due to vibrations during vehicular running or by its own weight. Thus, the monitor device can be prevented from being degraded.

What is claimed is:

1. A monitor device including a support member mounted on a ceiling surface and a display member, said display member being supported near a proximal end by said support member so as to be pivotally movable between a stowed position along said ceiling surface and a downwardly pivoted position, comprising:

a restricting member for preventing said display member from moving pivotally to the downward position when the display member is located in the stowed position; and wherein a distal end of the display member engages with said restricting member when the support member is moved in the direction of said ceiling surface after the display member is moved to the stowed position, so as to prevent the display member from pivotally moving toward the downward position.

2. A monitor device according to claim 1, further including a drive means for pivotally moving the display member and a moving means for moving said support member.

3. A monitor device according to claim 2, wherein said drive means operates so as to pivot said display member toward said ceiling surface before said support member and the display member located in said stowed position move in said direction.

4. A monitor device according to claim 1, wherein in a downwardly pivoted position the display member can further move pivotally about a substantially vertical axis so as to permit the direction of a display screen to be changed to the right and left.

5. A monitor device comprising;

a receptacle member fixed to a ceiling surface and having a stowing recess that is open generally downward;

a support member for movably supporting a display member disposed within said stowing recess, said display member being supported by said support member so as to be pivotable between a stowed position along said ceiling surface and a downwardly pivoted position;

a restricting means for preventing said display member from pivotally moving toward the downward position when the support member is located in the stowed position; and wherein the display member engages with said restricting member when the display member is pivoted to the stowed position and the support member is moved along said ceiling surface, so as to prevent the display member from pivotally moving toward the downward position.

6. A monitor device according to claim 5, wherein when said display member has pivotally moved to said stowed position, it is received within said stowing recess, and said restricting means is disposed within the stowing recess.

7. A monitor device according to claim 5, further including a drive means for pivotally moving said display member and a moving means for moving said support member.

8. A monitor device according to claim 7, wherein said drive means operates so as to pivot said display member toward said ceiling surface before said support member and the display member located in said stowed position move in the direction along the ceiling surface.

9. A monitor device according to claim 5, wherein a base member is fixed to said ceiling surface, said receptacle member is fixed to the underside of said base member, a circuit board for control is installed within said base member, and said support member disposed within the receptacle member and said circuit board are connected together through a flexible wiring member.

10. A monitor device according to claim 5, wherein in a downwardly pivoted position the display member can further move pivotally about a substantially vertical axis so as to permit the direction of a display screen to be changed to the right and left.

11. A monitor device comprising:

a receptacle member fixed to a ceiling surface in the interior of a vehicle and having a stowing recess that is open generally downward;

a support member for supporting a display member disposed within said stowing recess and movable between forward and rearward directions of the vehicle;

said display member being supported by said support member so as to be pivotable between a stowed position along said ceiling surface and a downwardly pivoted position;

a restricting means for preventing said display member from pivotally moving toward the downward position when said support member is located in the stowed position; and wherein the display member disengages from said restricting means and can move pivotally to said downward position when the support member is moved in a forward direction of the vehicle.

12. A monitor device according to claim 11, wherein when said display member has pivotally moved to said stowed position, it is received within said stowing recess, and said restricting means is disposed within the stowing recess.

13. A monitor device according to claim 11, further including a drive means for pivotally moving said display member and a moving means for moving said support member.

14. A monitor device according to claim 13, wherein said drive means operates so as to pivot said display member toward said ceiling surface before said support member and the display member located in said stowed position move in the rearward direction of the vehicle.

15. A monitor device according to claim 11, wherein a base member is fixed to said ceiling surface, said receptacle member is fixed to the underside of said base member, a circuit board for control is installed within said base member, and said support member disposed within said receptacle member and said circuit board are connected together through a flexible wiring member.

16. A monitor device according to claim 11, wherein in a downward position the display member can further move pivotally about a substantially vertical axis so as to permit the direction of a display screen to be changed to the right and left.

17. A monitor device including a support member mounted on a ceiling surface and a display member, said display member being supported by said support member so as to be pivotally movable between a stowed position along said ceiling surface and a downwardly pivoted position, comprising:

a restricting member for preventing said display member from moving pivotally to the downward position when the display member is located in the stowed position;

wherein the display member engages with said restricting member when the support member is moved in the direction of said ceiling surface after the display member is moved in the direction of said ceiling surface after the display member is moved to the stowed position, so as to prevent the display member from pivotally moving toward the downward position; and wherein in a downwardly pivoted position the display member can further move pivotally about a substantially vertical axis so as to permit the direction of a display screen to be changed to the right and left.

18. A monitor device according to claim 17, further including a drive means for pivotally moving the display member and a moving means for moving said support member.

19. A monitor device according to claim 18, wherein said drive means operates so as to pivot said display member toward said ceiling surface before said support member and the display member located in said stowed position move in said direction.

* * * * *